(12) United States Patent
Greven et al.

(10) Patent No.: US 11,630,881 B2
(45) Date of Patent: Apr. 18, 2023

(54) DATA INSIGHT AUTOMATION (71) Applicant: SAP SE, Walldorf (DE)

(72) Inventors: Boris Greven, Viernheim (DE);
Michael Jung, Quierschied (DE)

(73) Assignee: SAP SE, Walldorf (DE)

( * ) Notice: Subject to any disclaimer, the term of this patent is extended or adjusted under 35 U.S.C. 154(b) by 1058 days.

(21) Appl. No.: 16/221,240

(22) Filed: Dec. 14, 2018

(65) Prior Publication Data

US 2020/0193230 A1 Jun. 18, 2020

(51) Int. Cl.
*G06F 18/214* (2023.01)
*G06N 20/00* (2019.01)
*G06F 16/907* (2019.01)
*G06F 16/904* (2019.01)
*G06N 5/025* (2023.01)

(52) U.S. Cl.
CPC ........ *G06F 18/2148* (2023.01); *G06F 16/904* (2019.01); *G06F 16/907* (2019.01); *G06N 5/025* (2013.01); *G06N 20/00* (2019.01)

(58) Field of Classification Search
CPC ... G06K 9/6257; G06F 16/904; G06F 16/907; G06F 16/906; G06N 5/025; G06N 20/00
See application file for complete search history.

(56) References Cited

U.S. PATENT DOCUMENTS

| 9,104,961 B2 | 8/2015 | Gordon et al. | |
| 2004/0010310 A1 | 1/2004 | Peyman | |
| 2005/0251013 A1* | 11/2005 | Krishnan | G06T 7/0012 600/407 |
| 2013/0170637 A1* | 7/2013 | Klemm | G06Q 30/016 379/265.09 |
| 2014/0012870 A1* | 1/2014 | Wark | G06F 16/90335 707/769 |
| 2014/0257122 A1* | 9/2014 | Ong | A61B 5/02405 705/2 |
| 2015/0178366 A1* | 6/2015 | Farahbod | G06F 16/217 707/603 |
| 2016/0078361 A1 | 3/2016 | Brueckner et al. | |
| 2016/0275413 A1 | 9/2016 | Shi et al. | |
| 2016/0342707 A1 | 11/2016 | Drobek et al. | |
| 2017/0124487 A1 | 5/2017 | Szeto et al. | |
| 2017/0262769 A1 | 9/2017 | McShane et al. | |
| 2017/0316324 A1* | 11/2017 | Barrett | G06N 20/20 |

* cited by examiner

*Primary Examiner* — Pei Yong Weng
(74) *Attorney, Agent, or Firm* — Klarquist Sparkman, LLP

(57) ABSTRACT

Static and dynamic process data of a system are accessed. Thereafter, using this accessed process data, a subset of such data forming relevant data for a particular context is derived. The data is then explored using a computer-implemented process or processes to automatically get insight into information about structures, distributions and correlations of the relevant data. Rules can be generated based on the exploring of relevant data that describe data dependencies within the relevant data. These generated rules can later be used to generate synthetic data. Such synthetic data, in turn, can be used to for a variety of purposes including the training of a machine learning model while, at the same time, complying with applicable privacy and data protection laws and regulations.

19 Claims, 6 Drawing Sheets

DATA INSIGHT AUTOMATION

TECHNICAL FIELD

The subject matter described herein relates to the automation of insight into data used by computer implemented processes.

BACKGROUND

Data protection and privacy (DPP) regulations are becoming increasingly adopted by various governmental bodies throughout the world. Such DPP regulations, in turn, place significant restrictions on how DPP implicated data can be exploited. Such restrictions have a significant impact on applications/offerings using artificial intelligence (AI) and/or machine learning (ML) which necessarily requires meaningful data for training purposes. In particular, AI and ML models require relevant and contextual data in order to be properly trained and altering the training data to accommodate DPP can make such data ineffective/less effective for such purposes.

SUMMARY

In one aspect, static and dynamic process data of a system are accessed. Thereafter, using this accessed process data, a subset of such data forming relevant data for a particular context is derived. The data is then explored using a computer-implemented process or processes to automatically get insight into information about structures, distributions and correlations of the relevant data. Rules can be generated based on the exploring of relevant data that describe data dependencies within the relevant data. These generated rules can later be used to generate synthetic data. Such synthetic data, in turn, can be used to for a variety of purposes including the training of one or more machine learning models while, at the same time, complying with applicable privacy and data protection laws and regulations. These machine learning models can be used for a variety of applications including classifying data input into such models.

The deriving can utilize distance-based metrics to derive the relevant data for the particular context. The distance-based metrics can specify distances between tables within the relevant data, data elements within the tables, or table fields and occurrence of a trigger in code segments, module pools, or function module call stacks.

The deriving can additionally or alternatively utilize importance-based metrics to derive the relevant data for the particular context. The importance-based metrics can be based on a frequency of usage of a table within the relevant data, data elements within such table, or table fields within such table and within a pre-defined distance.

The static and dynamic process data can include business data, metadata characterizing the business data, and business process data. The static information can be independent from specific usage of the system and can be stored in at least one of: a code base, a data dictionary (DDIC), or configuration and customizing settings. The dynamic data can be dependent on a current usage of the system and can be stored in or derived from at least one of: current table content for master data and transaction data, a situation context of a process, process instance content, or dynamic DDIC information.

The relevant data can be automatically identified in a variety of manners including by analyzing data and metadata to identify columns and field within the static and dynamic process data that are required for the generation of the synthetic data.

In certain cases, a data scientist can provide user-generated input via a graphical user interface to enrich the relevant information with additional contextual information.

Further, the relevant data and related metadata can be analyzed to provide a technical description of the distribution of data values and dependencies among the relevant data.

In an interrelated aspect, a machine learning model is deployed that is trained using synthetic data generated using the techniques described and illustrated herein. Once deployed, the machine learning model receives data for classification purposes and provides an output indicating such a classification.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the techniques described herein provide more rapid availability to data, enhanced flexibility with regard to data structures, and flexible amounts of generated data (thereby adopting use case data storage requirements).

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to the generation of data that complies with DPP regulations while, at the same time, being of particular import to be used for consumption by and training for machine learning models. In the context of machine learning, working with real data is crucial. However, having access to real customer data can lead to legal issues because of current and planned data protection and privacy (DPP) regulations in many countries. Such regulations can act to impede the creation of enhanced software-based applications/offerings that utilize machine learning and which would otherwise be trained using such data.

While the current disclosure describes a specific methodology, the current disclosure is not limited to such an arrangement. The current subject matter provides advanced computing techniques for providing insight into the topics of business understanding (i.e. "know the respective business domain") and data understanding (i.e. "explore and describe the real data in this business domain") which are important for the quality of a synthetic data set (as further described below). In particular, the current subject matter provides enhanced techniques for implementing such tasks to overcome human inefficiency issues while, at the same time, complying with legal/DPP issues.

In order to create synthetic mass data of appropriate quality, identifying the all relevant real data for the specific context and describing its metadata are an essential foundation. This creation requires identifying required data and data structures (including enhancements), their frequencies, and distributions of the real data, etc. With the current subject matter, relevant data is identified and selected in an automated or assisted way, and respective metadata relationships are automatically generated by statistics as well as the distribution of the real data on customer systems. The meta data relationships can be expressed in a formal language to be an input for data generation tools.

Figure 1:
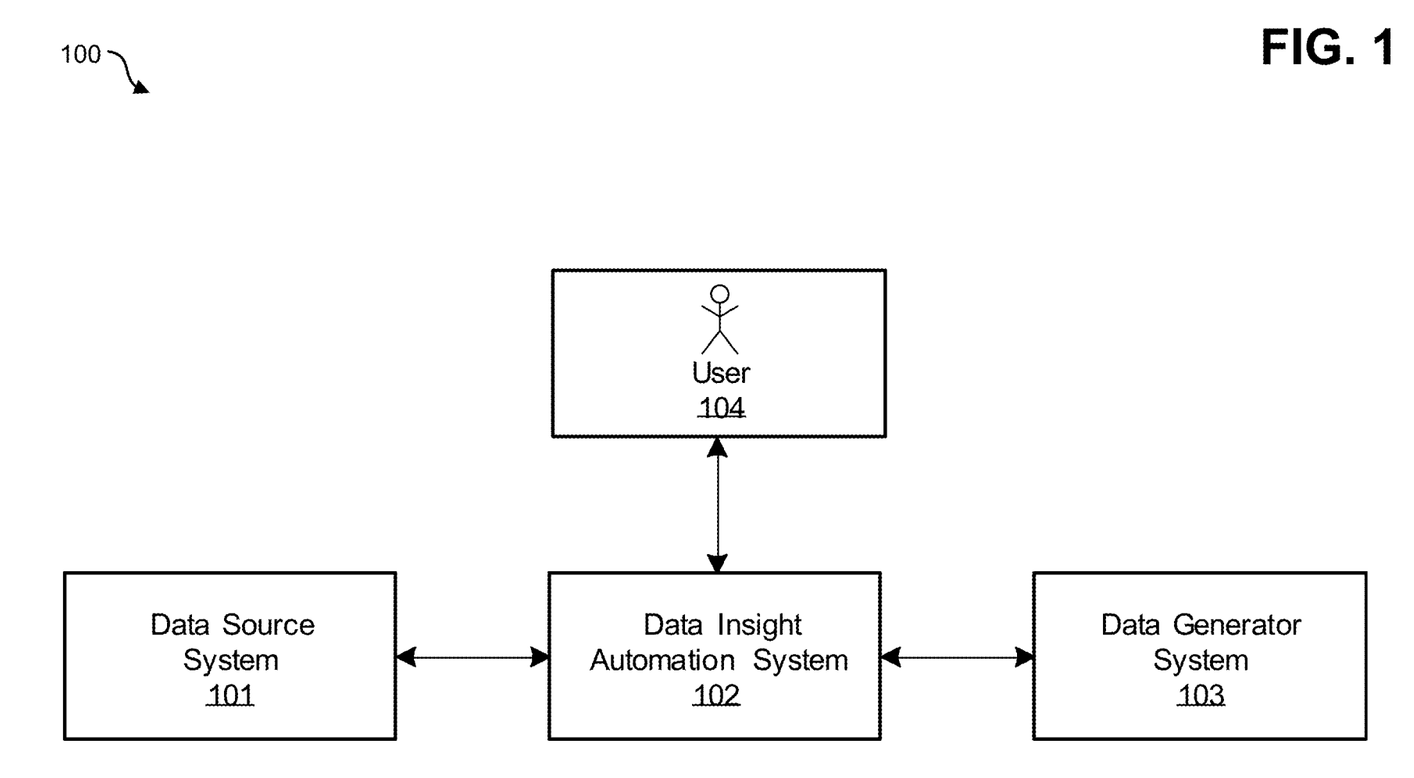
FIG. 1 is a diagram illustrating a data insight automation system.

FIG. 1 is a diagram 100 that illustrates a data insight automation (DIA) system 102 in which a user client 101 can interact therewith. The DIA system 102 can interact with a data source system 103 that provides input date to the DIA system 102 and with a data generator system 104 that consumes the output of the DIA system 102 for generating data as provided below. Each of the user client 101, the DIA system 102, the data source system 103, and the data generator system 104 can comprises one or more computing device (e.g., computers, servers, IoT devices, mobile phones, etc.) that each include memory and one or more data processors for implementing instructions loaded into the corresponding memory.

Figure 2:
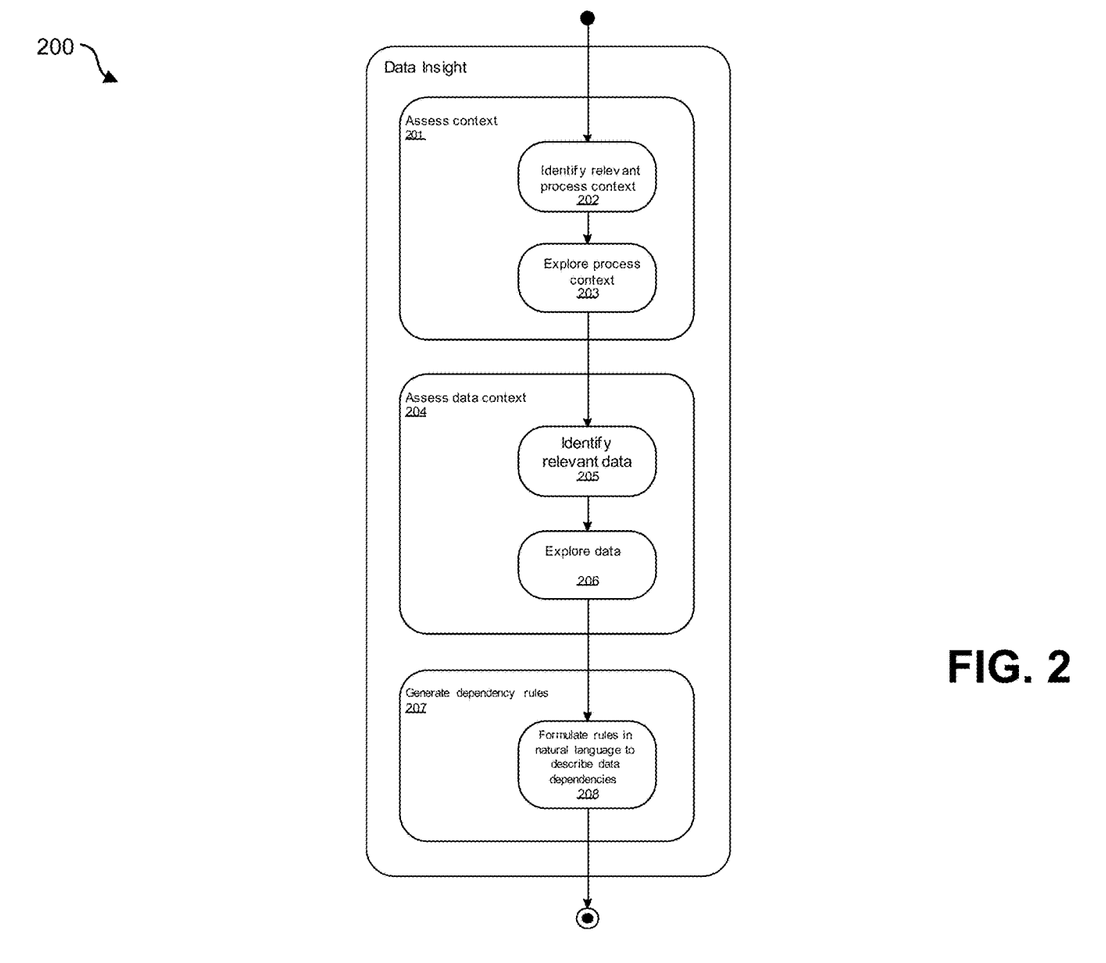
FIG. 2 is a process flow diagram illustrating a manual process for obtaining insight into domain data.

FIG. 2 is a process flow diagram 200 illustrating how data providing insight can be collected. As can be appreciated, this process requires manual human intervention and, at the same time, is a cumbersome procedure that requires a significant amount of domain expertise. Initially, at 201, a domain expert assesses the context in focus. This assessment can be based on collaboration with the systems owners and users and on such expert's knowledge where to find the needed information about the specifics of the present process in the system. The expert identifies, at 202, and explores, at 203, the determining context entities for the used process realization in the system with the goal to extract the relevant data entities for this process for access at 204. Not all content of these data entities may be important for data insight, and, as such, the subsequent identification of relevant data at 205 is also a task that typically requires some deep expertise. Thereafter, at 206, the exploration of this selected data sources provides a technical understanding of the distribution of data values and dependencies between data. Based on the understanding of such dependencies, the expert formulates rules at 207, 208 (typically in natural language) which are taken as an input for building the specifically formatted input of the data generator system 104.

Although some parts of the tasks in the procedure of FIG. 2 may be supported by automation (e.g., the technical derivation of data value distributions, etc.), the major parts of the entire procedure require very time-consuming manual tasks by experts as of today. In addition, the manual process is disadvantageous because of lack of or unavailability of needed human resources with the appropriate expertise, inaccurate/incomplete/ineffective rules due to insufficient human expertise, higher handling costs, and the need to consider GDPR-compliance rules for humans looking at the true real data, etc.

Figure 3:
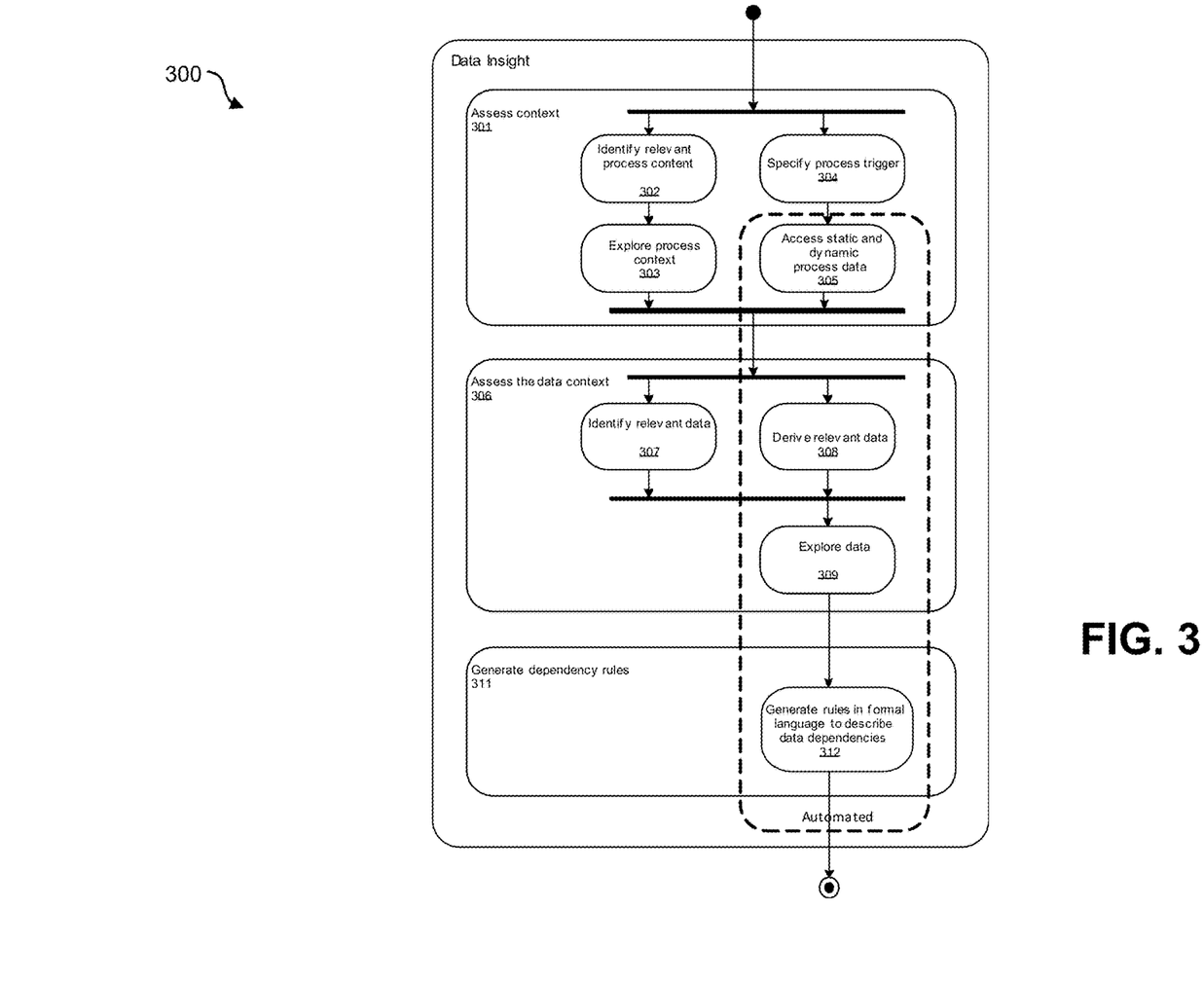
FIG. 3 is a process flow diagram illustrating an automated process for obtaining insight into domain data.

With reference to the process flow diagram 300 of FIG. 3, the current subject matter provides enhanced techniques to orchestrate, assist and replace the manual domain expert requirements as in FIG. 2. The block with dotted border in FIG. 3 contains a sequence of automated operations. The process can include three main phases, assessing the context 301, assessing the data context 306, and generating dependency rule 311. Initially, at 304, starting points in the system define the trigger for identifying the relevant process context. The process triggers can be any relevant technical entities in the system, such as transactions, tables, views, data elements or many others. These triggers allow for identifying and obtaining the determining significant context data at 305 for the used process realization by applying specific distance metrics-based and/or importance metrics-based threshold algorithms to the process triggers. As one example, in case of a table as trigger, distance metrics can be calculated as the distance of the occurrence of another table, its data elements, or its table fields from the occurrence of the trigger in code segments, module pools, or function module call stacks. As another example, importance metrics can be calculated from the frequency of the usage of this other table, its data elements, or its table fields within this distance. Candidates for the context data and for the environment for applying these metrics to them can be found by analyzing the system's static or dynamic process data or a combination of both. Static data provides information, which is independent from the specific usage history of the present system, whereas information from dynamic data is dependent from the current situation and usage of the system. For instance, static information is typically stored in the code base, data dictionary (DDIC), or configuration and customizing settings, whereas dynamic data typically can be found in the current table content for master data and transaction data, situation context of the process and other process instance content, etc., but also in some dynamic parts of the DDIC information. Thresholds for the metrics can be specified in order to restrict the amount of context candidates to the set of context data. Context data can be determined from the business data, business data metadata and business process data which are stored in the database tables of the business system, for example, master data such as business partners, products, etc. or transaction data such as sales orders, invoices, etc. Once the data has been assessed at 305, it can be enriched manually.

Later, at 308, relevant data within such accessed data context can be identified. The tables of the context data typically have components (columns and fields, respectively), at which not all of them are important for the intended generation of synthetic data for this domain. The goal of step 308 is to identify these columns and fields, whose relationships and value distributions have to be considered for the generation of synthetic data. Metadata analysis of the table relationships as well as data content analysis (such as filling degree of table fields, etc.) can enable automation by revealing relevant database tables and their relevant table fields, respectively. Furthermore, the amount of relevant data detected automatically (i.e. table fields and their relationships which should be considered furthermore), can be changed (i.e. added or reduced, or modified), at 307, by results from manual evaluations of human experts if required.

The automated exploration of the selected relevant data statistical and data science methods can, at 309, provide a technical description of the distribution of data values and dependencies between data, such as correlations of table fields within one table and between several tables). For example, in case of a qualitative property of an entity with categorical values (whether it be nominal or ordinal), the frequency distribution of values can be determined, in case of a quantitative property of an entity with numerical values (whether it be discrete or continuous) the distribution function can be determined. Association analysis and similar methods can reveal the correlations between table fields, for instance.

Based on the description of this technical data exploration, at 311, rules described in a formal language can generated fully automatically as an input for a subsequent data generator system 104.

Figure 4:
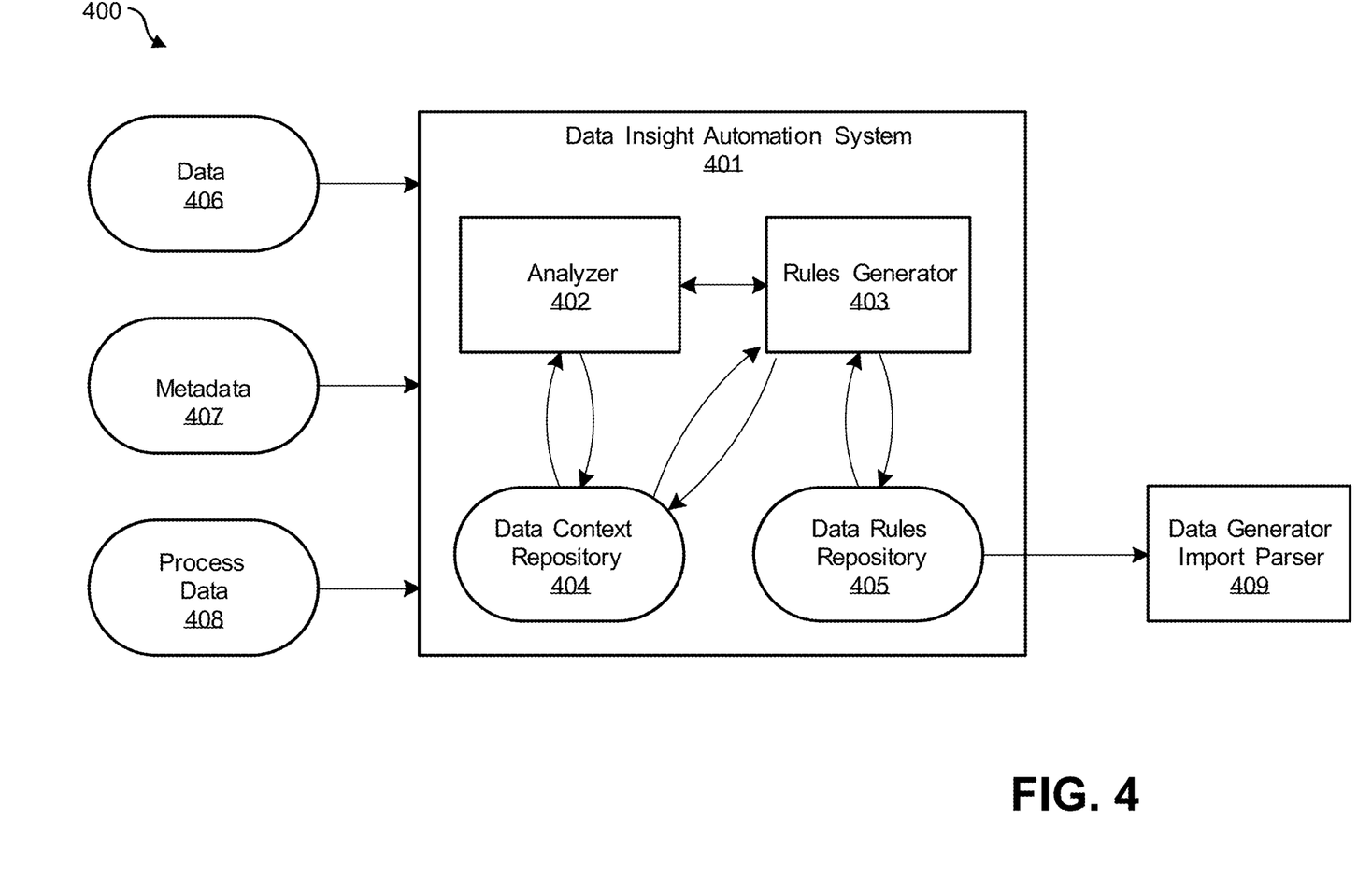
FIG. 4 is a second diagram illustrating components of a data insight automation system.

FIG. 4 is a diagram 400 illustrating a sample computing environment for implementing the subject matter of FIG. 3. A Data Insight Automation (DIA) system 401 can generate the required input for a data generator system in a fully automated way. The output of such DIA system 401 can be referred to as synthetic data. Synthetic data in this regard can refer to artificial data which does not refer to or describe any real existing object, process or person. With synthetic data, no DPP relevant concerns can arise. Business data 406, business data metadata 407 and business process data 408 are the relevant inputs for this DIA system 401.

The DIA system 401 can be structured in the following components representing agents and storages, which compromise the described functionality and interact with each other: an analyzer 402 which analyzes the data; a rules generator 403 which generates rules for the association dependencies of the relevant data; a data context repository 404 contains the data context of relevant data (such as specific tables and table fields); a data rules repository 405 contains the rules described in a formal language as an input for a data generator import parser 409 of a data generator system. In this regard, relevant data is the data which is important for the current data automation insight process use case; it is the result of process operations 303 and 305 of FIG. 3. The data context repository 404 contains information that describes the characteristics and properties of respective data such as correlations between tables and table fields, value frequencies and distributions of table field values of the table records; it is the result of operations 308 and 309 of FIG. 3.

Afterwards the generation of synthetic data can be executed by using a data generator specific import parser 409, which gets the DIA generated rule descriptions (from the rules repository 405) as input and parses these rules into the specific input format of the data generator.

Figure 5:
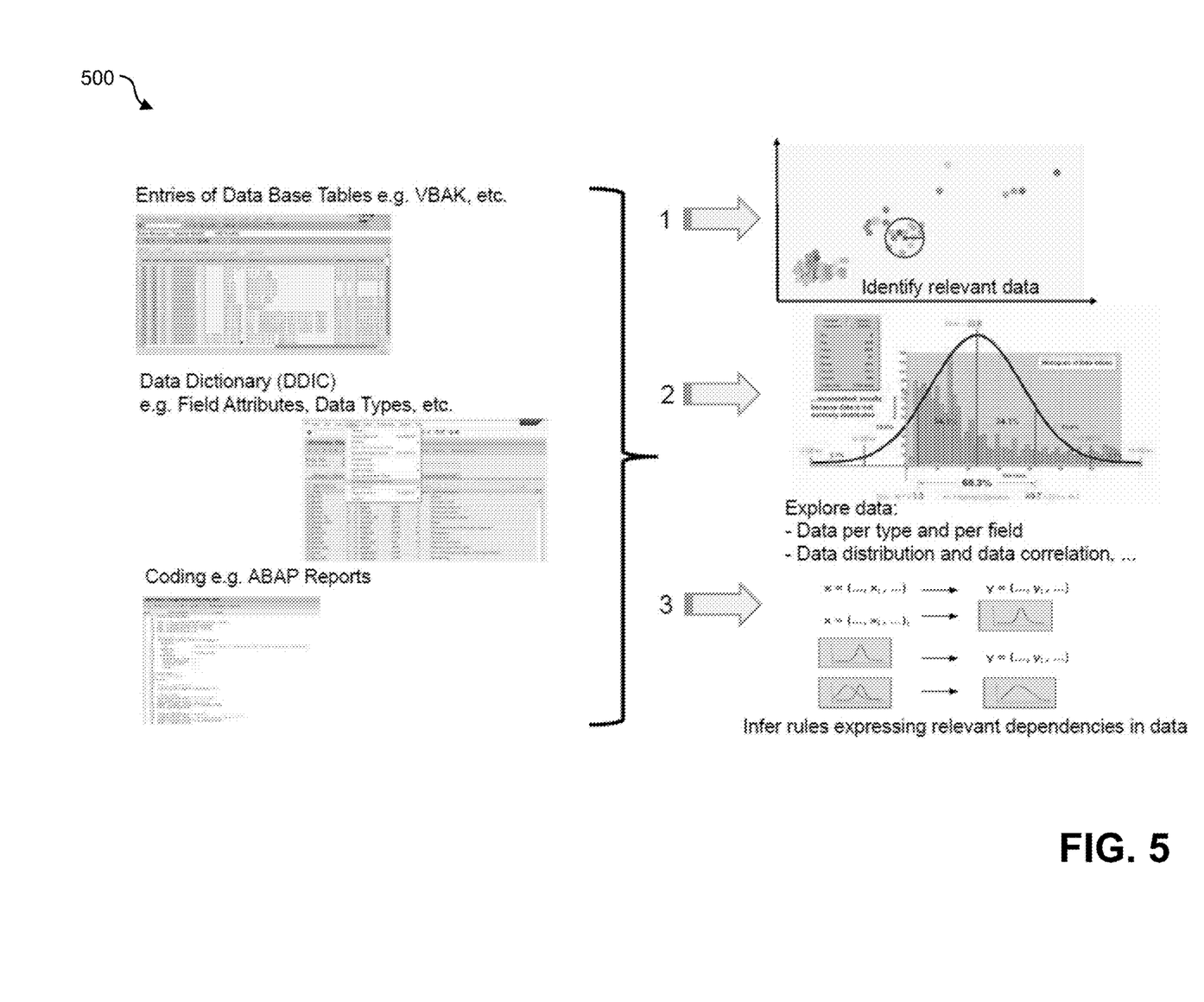
FIG. 5 is a diagram illustrating an automated procedure implemented by the data automation system of FIG. 4.

FIG. 5 is a diagram 500 providing an example use of the current subject matter. In this example, a process trigger entity has been identified that plays a significant role in the sales process, such as database table VBAK (containing sales order header data). Relevant sources for identifying the specific context entities for the sales process are stored in the system's data dictionary (DDIC), in the content of data base tables and in the code base in the system's applications. Starting from VBAK and based on these sources, using the current subject matter, all significant system data stores (i.e. database tables, for instance) in focus can be derived within a distance below and with an importance above specific thresholds (indicated by the area limited by the circle). In the example of FIG. 5, the table VBAP (containing sales order item data) probably is such a relevant database table.

In these database tables, using the processes provided herein, relevant sales process information (such as data types and fields) can be identified and technically explored. The result contains value distributions of fields and data correlation information between fields.

In this example, for instance, the item distribution expressed as product and sales quantity in VBAP respective to its VBAK header is essential information, and the correlation of this product item data to the customer data stored in the header might be high. From this result, rules expressing these relevant dependencies can be inferred. In addition, rules can be formulated that correlate the value distribution of the customer data fields with the respective product item data fields.

Figure 6:
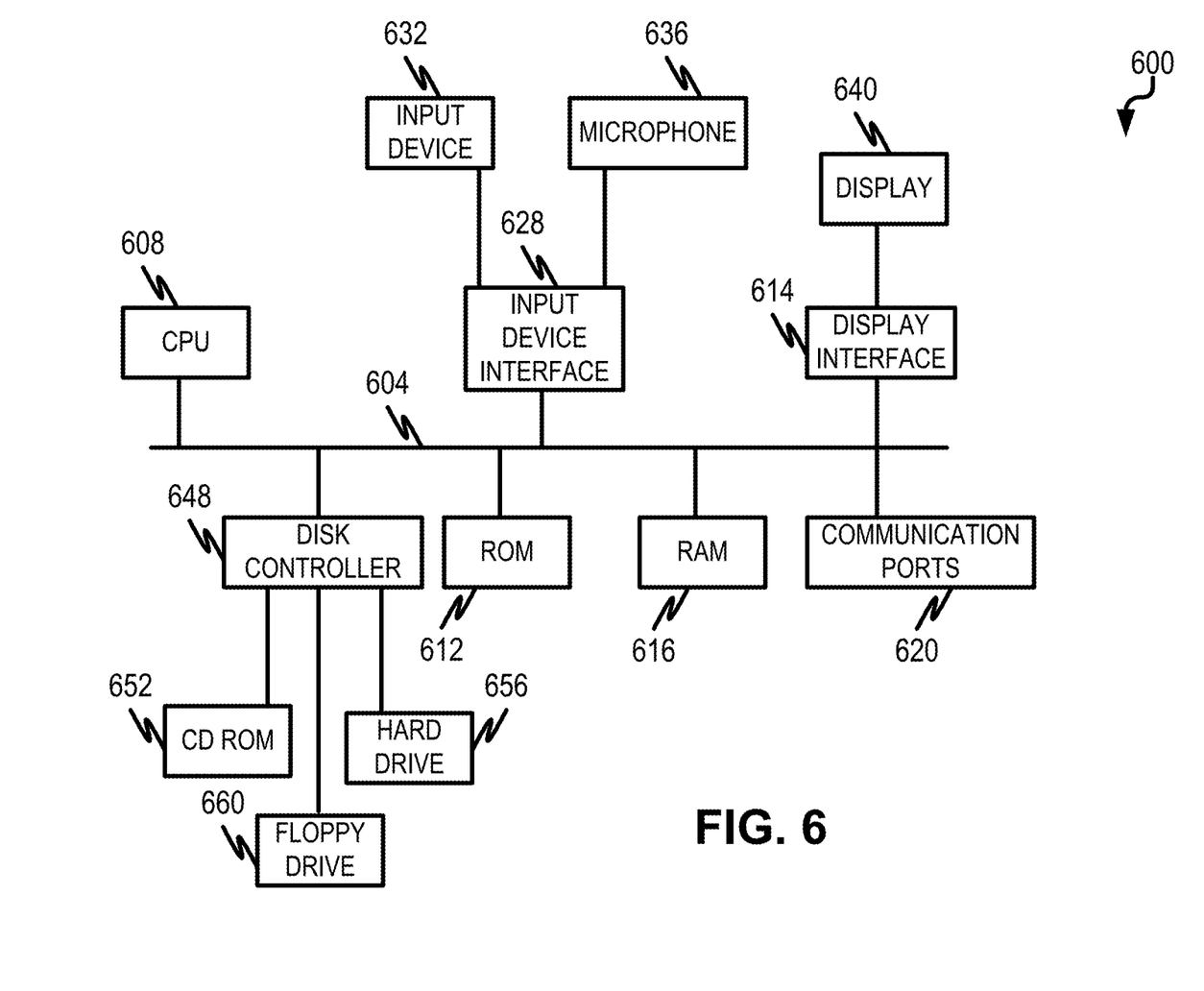
FIG. 6 is a diagram illustrating aspects of a computing device for implementing subject matter described and/or illustrated herein.

FIG. 6 is a diagram 600 illustrating a sample computing device architecture for implementing various aspects described herein. A bus 604 can serve as the information highway interconnecting the other illustrated components of the hardware.

A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, the method comprising:
    defining one or more process triggers for identifying one or more particular contexts within a system;
    in response to a process trigger from the system, accessing static process data of the system and dynamic process data of the system, wherein the static process data is independent of a specific usage history of the system and the dynamic process data is dependent on a current usage of the system;
    in response to the process trigger, identifying a particular context from the process trigger;
    deriving within the accessed static process data and the accessed dynamic process data a subset of such data forming relevant data for the particular context identified from the process trigger;
    exploring the relevant data to automatically obtain insight into information about structures, distributions, and correlations of the relevant data;
    generating, based on the exploring of the relevant data, rules to describe data dependencies;
    generating, by a data generator system using the generated rules, synthetic data; and
    applying at least a portion of the synthetic data to training of a machine learning model to generate a trained machine learning model.

2. The method of claim 1, wherein the deriving utilizes distance-based metrics to derive the relevant data for the particular context.

3. The method of claim 2, wherein the distance-based metrics specify distances between tables within the relevant data, data elements within the tables, or table fields and occurrence of a trigger in code segments, module pools, or function module call stacks.

4. The method of claim 1, wherein the deriving utilizes importance-based metrics to derive the relevant data for the particular context.

5. The method of claim 4, wherein the importance-based metrics are based on a frequency of usage of a table within the relevant data, data elements within such table, or table fields within such table and within a pre-defined distance.

6. The method of claim 1, wherein the static process data and the dynamic process data comprise business data, metadata characterizing the business data, and business process data.

7. The method of claim 6, wherein the static process data is stored in at least one of: a code base, a data dictionary (DDIC), or configuration and customizing settings.

8. The method of claim 6, wherein the dynamic process data is stored in or derived from at least one of: current table content for master data and transaction data, a situation context of a business process, process instance content, or dynamic DDIC information.

9. The method of claim 1, wherein the relevant data is identified by:
analyzing data and metadata to identify columns and fields within the static and dynamic process data that are required for the generation of the synthetic data.

10. The method of claim 1 further comprising enriching the relevant data based on user-generated input.

11. The method of claim 1 further comprising analyzing data and metadata within the relevant data to provide a technical description of the distribution of data values and dependencies among the relevant data.

12. The method of claim 1 wherein the machine learning model is trained to act as a classifier.

13. The method of claim 12 further comprising:
deploying the trained machine learning model to classify data input into the trained machine learning model.

14. A system comprising:
at least one data processor; and
memory storing instructions which, when executed by at least one data processor, result in operations comprising:
defining one or more process triggers for identifying one or more particular contexts within a system;
in response to a process trigger from the system, accessing static process data of the system and dynamic process data of the system, wherein the static process data is independent of a specific usage history of the system and the dynamic process data is dependent on a current usage of the system;
in response to the process trigger, identifying a particular context from the process trigger;
deriving within the accessed static process data and the accessed dynamic process data a subset of such data forming relevant data for the particular context identified from the process trigger;
exploring the relevant data to automatically obtain insight into information about structures, distributions, and correlations of the relevant data;
generating, based on the exploring of the relevant data, rules to describe data dependencies;
generating, by a data generator system using the generated rules, synthetic data; and
applying at least a portion of the synthetic data to a machine learning model to generate a trained machine learning model.

15. The system of claim 14, wherein:
the deriving utilizes both distance-based metrics and importance-based metrics to derive the relevant data for the particular context;
the distance-based metrics specify distances between tables within the relevant data, elements within the tables, or table fields and occurrence of a trigger in code segments, module pools, or function module call stacks;
the importance-based metrics are based on a frequency of usage of a table within the relevant data, data elements within such table, or table fields within such table and within a pre-defined distance.

16. The system of claim 14, wherein:
the static process data and the dynamic process data comprise business data, metadata characterizing the business data, and business process data;
the static process data is stored in at least one of: a code base, a data dictionary (DDIC), or configuration and customizing settings;
the dynamic process data is stored in or derived from at least one of: current table content for master data and transaction data, a situation context of a business process, process instance content, or dynamic DDIC information.

17. The system of claim 14, wherein the machine learning model is trained to act as a classifier.

18. The system of claim 17, wherein the operations further comprise:
deploying the trained machine learning model to classify data input into the trained machine learning model.

19. A computer-implemented method comprising:
deploying a trained machine learning model;
receiving, by the trained machine learning model, data for classification; and
providing, by the trained machine learning model, a classification of the received data;
wherein the trained machine learning model is generated by:
defining one or more process triggers for identifying one or more particular contexts within a system;
in response to a process trigger from the system, accessing static process data of the system and dynamic process data of the system, wherein the static process data is independent of a specific usage history of the system and the dynamic process data is dependent on a current usage of the system;
in response to the process trigger, identifying a particular context from the process trigger;
deriving within the accessed static process data and the accessed dynamic process data a subset of such data forming relevant data for the particular context identified from the process trigger;
exploring the relevant data to automatically obtain insight into information about structures, distributions and correlations of the relevant data;
generating, based on the exploring of relevant data, rules to describe data dependencies;
generating, by a data generator system using the generated rules, the synthetic data; and
applying at least a portion of the synthetic data to the training of a machine learning model to generate the trained machine learning model.

* * * * *